United States Patent [19]

Ostman

[11] Patent Number: 5,677,934
[45] Date of Patent: Oct. 14, 1997

[54] MULTIPATH PROPAGATION COMPENSATION IN A TDMA SYSTEM

[75] Inventor: Kjell I. Ostman, San Diego, Calif.

[73] Assignee: Nokia Mobile Phones Limited, Salo, Finland

[21] Appl. No.: 998,830

[22] Filed: Dec. 30, 1992

[51] Int. Cl.$^6$ ............................................ H03H 7/30
[52] U.S. Cl. .................. 375/349; 375/231; 375/232; 364/724.2; 364/724.1
[58] Field of Search .................. 375/99, 100, 12, 375/102, 14, 230, 231, 346, 349, 343; 364/724.2, 724.1; 333/18

[56] References Cited

U.S. PATENT DOCUMENTS

| | | | |
|---|---|---|---|
| 5,050,186 | 9/1991 | Gurcan et al. | 375/12 |
| 5,195,106 | 3/1993 | Kazecki et al. | 375/12 |
| 5,212,803 | 5/1993 | Uddenfeldt et al. | 375/12 |
| 5,214,391 | 5/1993 | Serizawa et al. | 375/102 |
| 5,230,077 | 7/1993 | Raith | 455/226.1 |
| 5,257,265 | 10/1993 | Su et al. | 375/12 |
| 5,263,026 | 11/1993 | Parr et al. | 375/102 |

FOREIGN PATENT DOCUMENTS

| | | |
|---|---|---|
| A-0 240 821 | 10/1987 | European Pat. Off. . |
| A-0 295 226 | 12/1988 | European Pat. Off. . |
| A-0 318 686 | 6/1989 | European Pat. Off. . |

*Primary Examiner*—Wellington Chin
*Assistant Examiner*—Jean B. Corrielus
*Attorney, Agent, or Firm*—Perman & Green, LLP

[57] ABSTRACT

A digital radio communications system includes a receiver that detects a signal stream comprising data frames interspersed with synchronizing signal sequences. The receiver includes multipath propagation compensating circuitry which the receiver selectively employs by use of a method that comprises the steps of: operating the multipath compensation circuitry to respond to a received signal string and provide a compensated signal train output; deriving a first signal quality estimate for the compensated signal train; disabling the compensated signal train output when the first signal quality estimate reaches a determined level; and detecting a remaining portion of the signal stream without multipath propagation compensation. In one version, the disabling step occurs when the first signal quality estimate reaches a predetermined threshold. In another version, a second signal quality estimate is derived for a noncompensated portion of the signal stream and when the second signal quality estimate exceeds the first signal quality estimate, the multipath propagation compensation circuitry is disabled. In still another version of the invention, multipath propagation compensation circuitry is initialized using several synchronizing sequences so as to achieve improved data recovery from an incoming signal.

14 Claims, 5 Drawing Sheets

FIG. 1

FIG. 2
CCD 18

MULTIPATH PROPAGATION COMPENSATION IN A TDMA SYSTEM

FIELD OF THE INVENTION

This invention relates to digital data transmission and reception systems, and more particularly, to a method and apparatus that compensates for signals received over plural, differing-length, transmission paths.

BACKGROUND OF THE INVENTION

Digital radio transmission systems often intersperse transmitted data with synchronization sequences that are known to a receiving station. Such synchronization sequences are utilized in time division multiple access (TDMA) systems, wherein separate users are allocated separate time slots of a same frequency bandwidth. Each time slot is accompanied by a synchronization sequence that enables a receiving station to achieve synchronization with the transmitted signal. Cellular telephone systems employ such TDMA protocols and are an example of a system in which the invention hereof may be employed.

Cellular telephone communication links often suffer from multipath propagation effects where a receiver sees copies of a transmitted signal that have travelled different paths between the transmitter and the receiver. Generally, such paths are of different lengths and cause the copies of the transmitted signal to be delayed relative to each other. If the signalling rates in such communication links are high enough, multipath propagation causes intersymbol interference which, in turn, makes detection of such signals impossible.

The term "symbol" is used in this context to refer to transmitted signals that are phase modulated with discrete phase relationships, each assigned phase relationship being a symbol that is subject to detection at a receiver. The term "intersymbol interference" refers to two or more symbols that are superimposed upon each other, phase detection of each symbol thus becoming extremely difficult, if not impossible.

Systems for modulating the phase of a carrier wave to represent digital binary data are known in the art. A four phase-state modulator (quaternary phase shift keying) enables a carrier wave to take four different phase values depending on the value assumed by successive two bit groups. Each of the four equi-spaced phases is separated by 90°.

If there is no multipath propagation, each symbol, upon detection at a receiver, will exhibit a phase having a known relationship to a reference phase, such that an equidistant constellation of symbol points in an I/Q space are determinable. The received signal will also exhibit a flat frequency spectrum profile. However, multipath propagation may cause phase and amplitude changes in one or more symbols, thereby causing a phase difference between a received symbol and a reference phase to be other than an expected constellation point. In addition the frequency spectrum profile becomes distorted. Under these circumstances, multipath propagation compensation is required.

Multipath propagation profiles are highly dependent upon the environment of the communication link. When the signalling period is long, and delayed copies of the transmitted signals are received within a time that is short in comparison to the signalling period, symbol interference is of little problem and consequently, multipath propagation compensation is not required. When copies of the transmitted signal are received with a delay that is long in comparison to the signaling period, multipath propagation compensation is required. In addition, when one of the stations in a radio communication system is mobile, the communications receiver sees rapid changes in phase and amplitude of a received signal and is required to track such changes. When a multipath propagated signal is received in a moving station, the multipath propagation compensation must track changes in both phase and amplitude, and additionally, changes in the multipath propagation frequency spectrum profile.

Multipath compensation is generally initialized by receipt of a known synchronizing sequence. "Initialization" means that the multipath compensation circuitry is adjusted so as to force a desired frequency spectrum profile upon the incoming signal. The synchronizing sequence enables a known sequence to be used to test the initialization state and to enable its adjustment if it is not as required. If, due to variations in a transmission channel, the receiver loses track of a received signal, it is reinitialized upon occurrence of a next synchronization sequence.

It is impossible in advance to know the severity of signal interference caused by multipath propagation in mobile transmission systems. As a result multipath propagation compensation methods are generally operational both during times when multipath signals are received, and also when no severely delayed signal copies are present. Such compensation, while necessary to handle delayed signal copies, lessens the sensitivity of a receiver. In fact, any compensation method results in an inferior signal as a result of stringent tracking requirements. Multipath compensation is thus preferably avoided if no delayed copies of a transmitted signal are present at the receiver.

In PCT International Application, publication number WO 91/00660 to Parmelee et al., a TDMA synchronization and equalization system is shown wherein a synchronizing sequence is sufficiently removed from the start of a TDMA time slot as to avoid the need for adaptive equalization. In addition, Parmelee et al. provide additional synchronizing information approximately mid-way in a time slot that enables further equalization during time slot processing. The Parmelee et al. system thus calls for an addition of additional synchronizing information during a time slot to maintain equalization.

Accordingly, it is an object of this invention to provide a system that recognizes when multipath propagation compensation should and should not be operated in a communications receiver.

It is another object of this invention to provide a system that automatically disables multipath propagation compensation in a communications receiver when signal errors indicate no need for such compensation.

It is a further object of this invention to provide an improved system for initializing multipath compensation circuitry so as to assure maximum incoming data recovery.

SUMMARY OF THE INVENTION

A digital radio communications system includes a receiver that detects a signal stream comprising data frames interspersed with synchronizing signal sequences. The receiver includes multipath propagation compensating circuitry which the receiver selectively employs by use of a method that comprises the steps of: operating the multipath compensation circuitry to respond to a received signal string and provide a compensated signal train output; deriving a first signal quality estimate for the compensated signal train;

disabling the compensated signal train output when the first signal quality estimate reaches a determined level; and detecting a remaining portion of the signal stream without multipath propagation compensation. In one version, the disabling step occurs when the first signal quality estimate reaches a predetermined threshold. In another version, a second signal quality estimate is derived for a noncompensated portion of the signal stream and when the second signal quality estimate exceeds the first signal quality estimate, the multipath propagation compensation circuitry is disabled. In still another version of the invention, multipath propagation compensation circuitry is initialized using several synchronizing sequences so as to achieve improved data recovery from an incoming signal.

DETAILED DESCRIPTION OF THE INVENTION

A digital radio telephone is described that employs a multipath compensation method that is initialized by a received synchronizing sequence. In a first version of the invention a compensation method tracks changes in the radio channel during reception of data and is reinitialized upon reception of each synchronizing sequence. If multipath propagation compensation loses track of a signal, it is generally best to continue without multipath compensation. The compensation circuitry cannot generally regain track of a signal without aid of a synchronizing sequence. A receiver not employing multipath propagation compensation can resynchronize itself, however. Thus, in this invention, the output from the multipath compensation circuitry is disabled upon a loss of synchronization, and the data is recovered without the aid of multipath compensation. More specifically, when symbol constellation points emanating from a multipath compensation path exhibit an Euclidean error that is greater than a similarly determined Euclidean error taken from a noncompensated signal processing path, the multipath compensation system is eliminated from the signal path.

Figure 1:
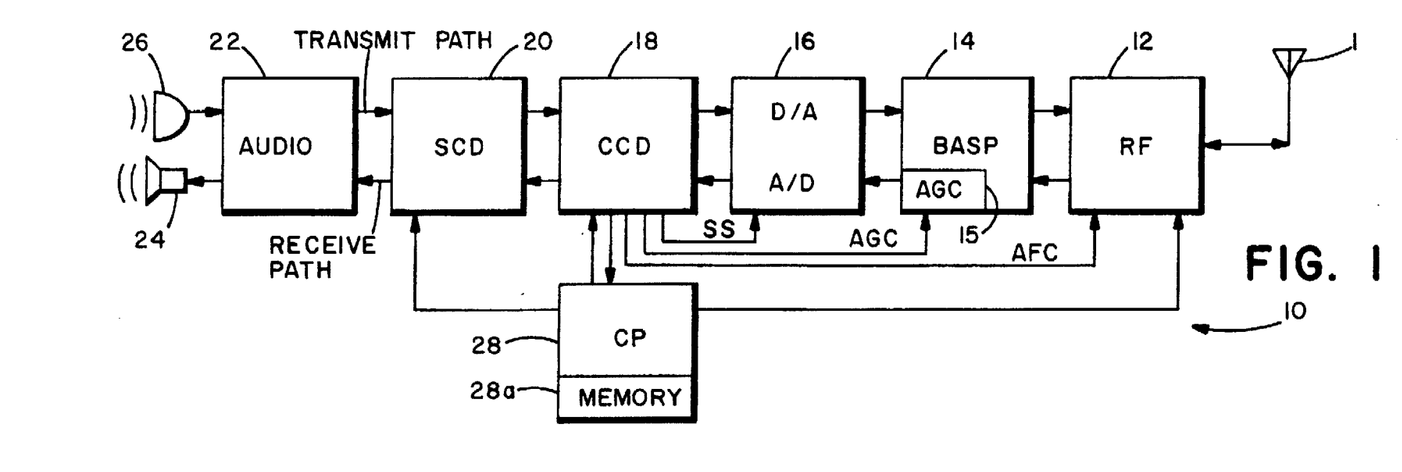
FIG. 1 is a block diagram of a digital radio telephone.

Referring to FIG. 1, a simplified block diagram is shown of a digital radio telephone 10. In the ensuing description, reference is made only to the reception path of the signal, although it should be realized that approximately the same signal processing occurs in the transmission path, but in reverse order.

An antenna 1 provides an input to a radio frequency (RF) block 12 which down-converts a received RF signal from an assigned frequency, in one or more steps, to a frequency low enough (preferably baseband) to be digitally processed. In addition, RF block 12 also accomplishes necessary channel filtering.

A baseband analog signal processing block (BASP) 14 includes an automatic gain circuit (AGC) 15, and performs symbol synchronization and baseband filtering. The output of the BASP 14 is applied to an analog to digital converter (A/D) 16.

A channel coder/decoder (CCD) 18 receives the digital representations of the synchronized and filtered data signals and determines channel correction coefficients for an adaptive equalizer.

A speech coder/decoder (SCD) 20 converts the bits received from CCD 18 into a Pulse Code Modulated (PCM) signal, which is then expanded and converted to an analog signal by an audio block (AUDIO) 22. The output of AUDIO block 22 is a speech signal that is output by a loudspeaker 24. A microphone 26 is also coupled to AUDIO block 22 and provides an analog representation of a user's speech. The user's speech is then passed through the transmit path, in a manner opposite to that described above, to be eventually transmitted from antenna 1.

A control processor (CP) 28 is employed to assign RF 12 and CCD 18 to a selected channel, to manage the required protocol between mobile station 10 and a base station (not shown), and to manage a required user interface. CP 28 includes or is coupled to a memory 28a that stores instructions and data.

Figure 2:
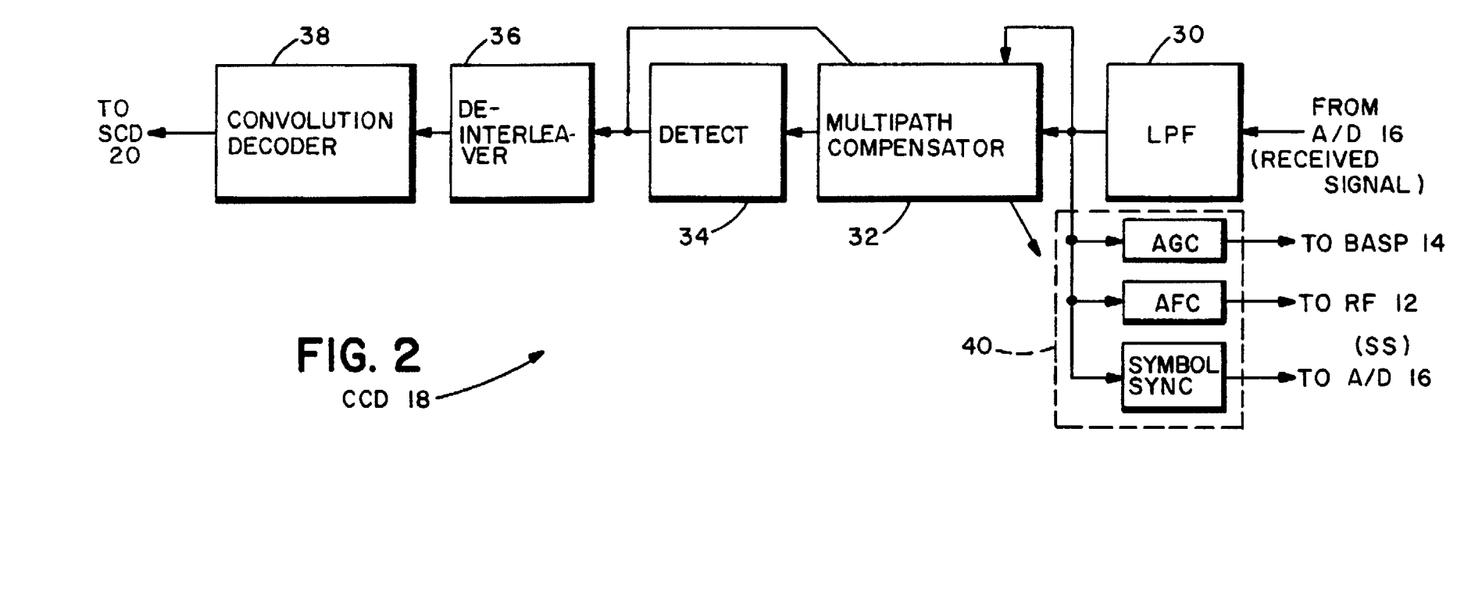
FIG. 2 is a block diagram of a decoder portion of a channel coder/decoder as shown in FIG. 1.

FIG. 2 is a block diagram that illustrates in greater detail components of the CCD 18. It should be realized that in some embodiments of the invention, more or less than the number of components shown in FIG. 2 may be employed.

The input signal from the A/D 16 is lowpass filtered by block LPF 30 and is then applied to a multipath compensation block. Multipath compensation block 32 may include an adaptive equalizer (filter) or other circuit (e.g. maximum sequence likelihood estimator) that enables a reestablishment of a desired frequency spectrum profile to an incoming signal and enables selection of a synchronizing sequence by a subsequent detector.

At the output of block 32 is a detector (DETECT) 34, wherein a most likely symbol from the signal constellation and the symbol's corresponding bit(s) are detected. As employed herein, a symbol is considered to be a signal amplitude and phase that is selected from a modulation signal constellation.

The detected symbol, together with an unequalized signal, is employed to update the coefficients of block 32. Detected bits are deinterleaved (block 36) and convolutionally decoded (block 38) before being passed to SCD 20 in FIG. 1. The operation of blocks 36 and 38 are conventional, and will not be described in further detail.

CCD 18 also includes a support block 40 having an automatic gain control (AGC), automatic frequency control (AFC) and symbol synchronization circuits that operate in a conventional manner. The output of the symbol synchronization circuit is employed to vary the sampling rate of A/D 16.

Figures 3, 4:
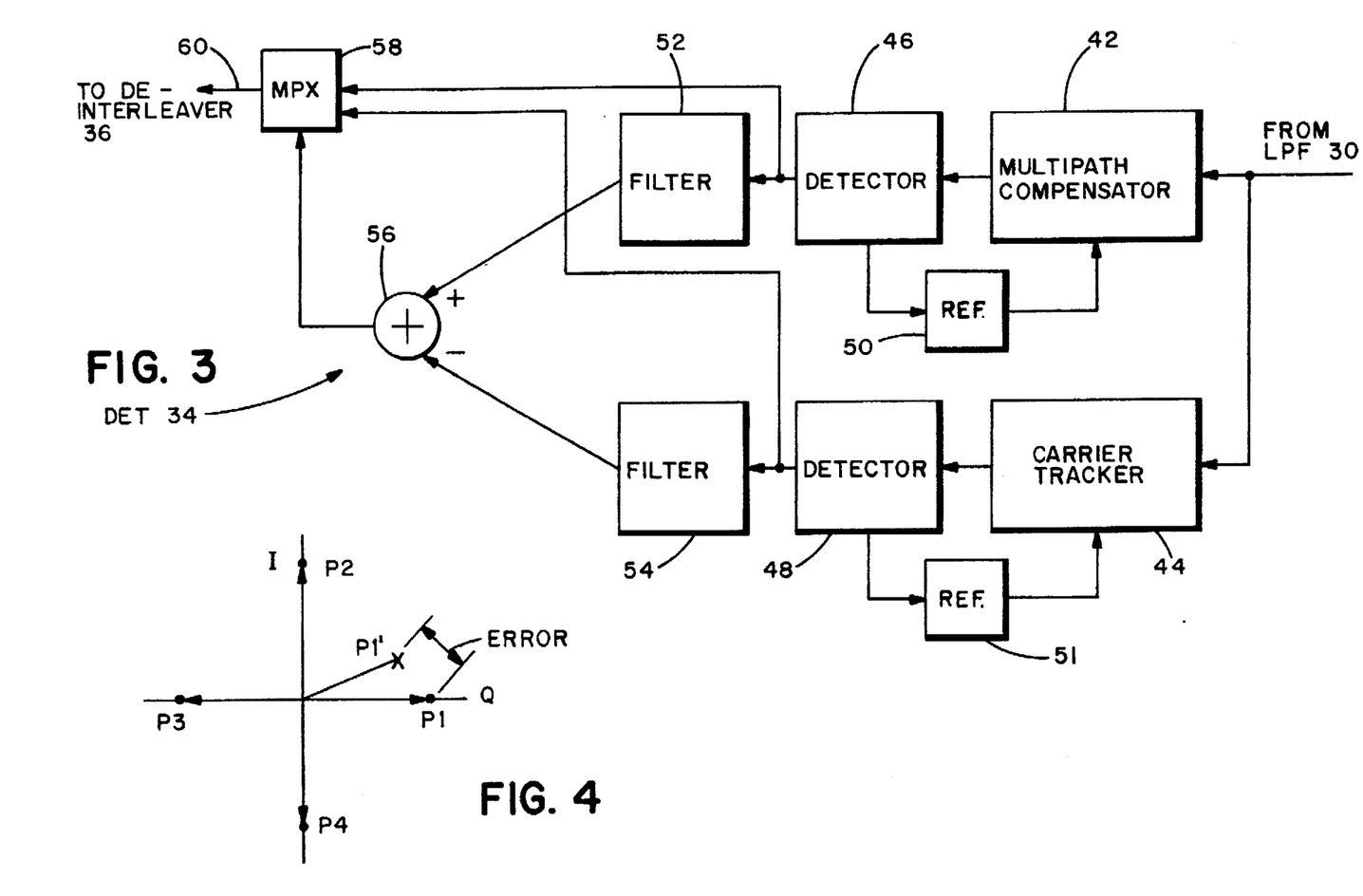
FIG. 3 is a block diagram of detector circuitry that performs the invention hereof.
FIG. 4 is an I/Q plot showing an expected signal phase constellation and error phase signal point.

FIG. 3 is a block diagram showing in greater detail circuitry within blocks 32 and 34 in FIG. 2. The output from low pass filter 30 is applied in parallel to a multipath compensator block 42 and a carrier tracker block 44. Multipath compensator block 42 and a detector 46, in the known manner, employ the synchronizing sequence to detect the direct path transmission signal, by modifying an adaptive filter contained therein to provide a substantially flat spectrum signal to detector block 46 and subsequently detecting the signal. Carrier tracker 44, by contrast, employs the synchronizing sequence to obtain a frequency lock on the carrier signal and provides that signal to detector block 48. A reference circuit 50 is controlled by an output from detector 46 to provide reference signals to block 42 in the multipath compensation path thereby enabling it to maintain synchronization during subsequently received data symbols. Similarly, a reference circuit 51 under control of detector 48, provides reference signals to block 44 in the carrier tracker circuit.

Detector blocks 46 and 48 operate identically and provide error signals that indicate a divergence of a received symbol constellation point from an expected symbol constellation point.

In FIG. 4, an I/Q plot is shown of four quadrature constellation points P1–P4, each of which embodies two bits of digital data. As signal quality degrades, a detected phase constellation point may be offset from a nearest signal phase point. Such a situation is shown wherein P1' indicates the detected phase point from an incoming symbol. An Euclidean distance between points P1 and P1' is calculated as an indication of a level of error in the received signal. Such calculation is carried out in both detectors 46 and 48, and the resulting error values are passed to filter blocks 52 and 54. Therein error signal values calculated for a plurality of subsequent symbols are low pass filtered to provide a running average error signal value. The filtered error signal values from detectors 46 and 48 are applied to a summing circuit 56 which, depending upon which of its inputs is greater, provides a controlling output to a multiplex block 58. Multiplex block 58 accordingly provides a detected signal that is either, multipath compensated or is not multipath compensated signal onto output line 60 to deinterleaver 36.

When an averaged error signal value output from filter 52 exceeds the average error value output from 54, multiplexer 58 feeds the output of detector 48 to output 60. When however, the filtered error signal value output from filter 52 is less than the output from filter 54, multiplexer 58 is controlled to provide the output of detector 46 to output line 60. As a result, the multipath compensated signal path is disconnected when the uncompensated signal quality estimate exceeds the compensated signal quality estimate. In such a manner, passage of a degraded multipath compensated signal is largely prevented.

In order to assure optimum operation of the circuit of FIG. 3, carrier tracker block 44 is included in the noncompensated signal path to prevent rapid fluctuations in phase and amplitude in a received signal from affecting the operation of detector 48. Thus, carrier tracker block 44 provides a tracking function that enables output of a stabilized carrier signal to detector 48. Furthermore, to prevent fluctuations at the beginning of each time slot from prematurely causing a disconnection of the multipath compensated signal, filter 54 in the uncompensated signal path is initialized to a higher value than the initialized value of filter 52. This may be accomplished by multiplying the output of filter 54 by a predetermined constant. Furthermore, to enable rapid detection of synchronization loss, filter 52 (in the multipath compensated signal path) is preferably provided with a broader bandwidth than filter 54 thus enabling it to gain its steady state value more rapidly and to react at a faster rate to changes in signal quality.

To detect whether multipath compensator block 42 is able to gain initial synchronization from a received synchronization sequence, the synchronization sequence itself may be passed through both multipath compensator block 42 and carrier tracker block 44 so that error signal outputs may be derived and compared. If the error value resulting from the synchronization sequence from filter 52 exceeds the output signal from filter 54, multiplexer 58 may be controlled to disconnect the multipath compensating path for an entire duration of the time slot.

Another method for determining whether initial synchronization has occurred is to count the number of symbols that were compensated before synchronization loss occurs and comparing this number to a preset threshold number. If the comparison indicates that the threshold has not been exceeded, the detection process may be repeated for the entire time slot, with the multipath compensation path disconnected.

Figure 5:
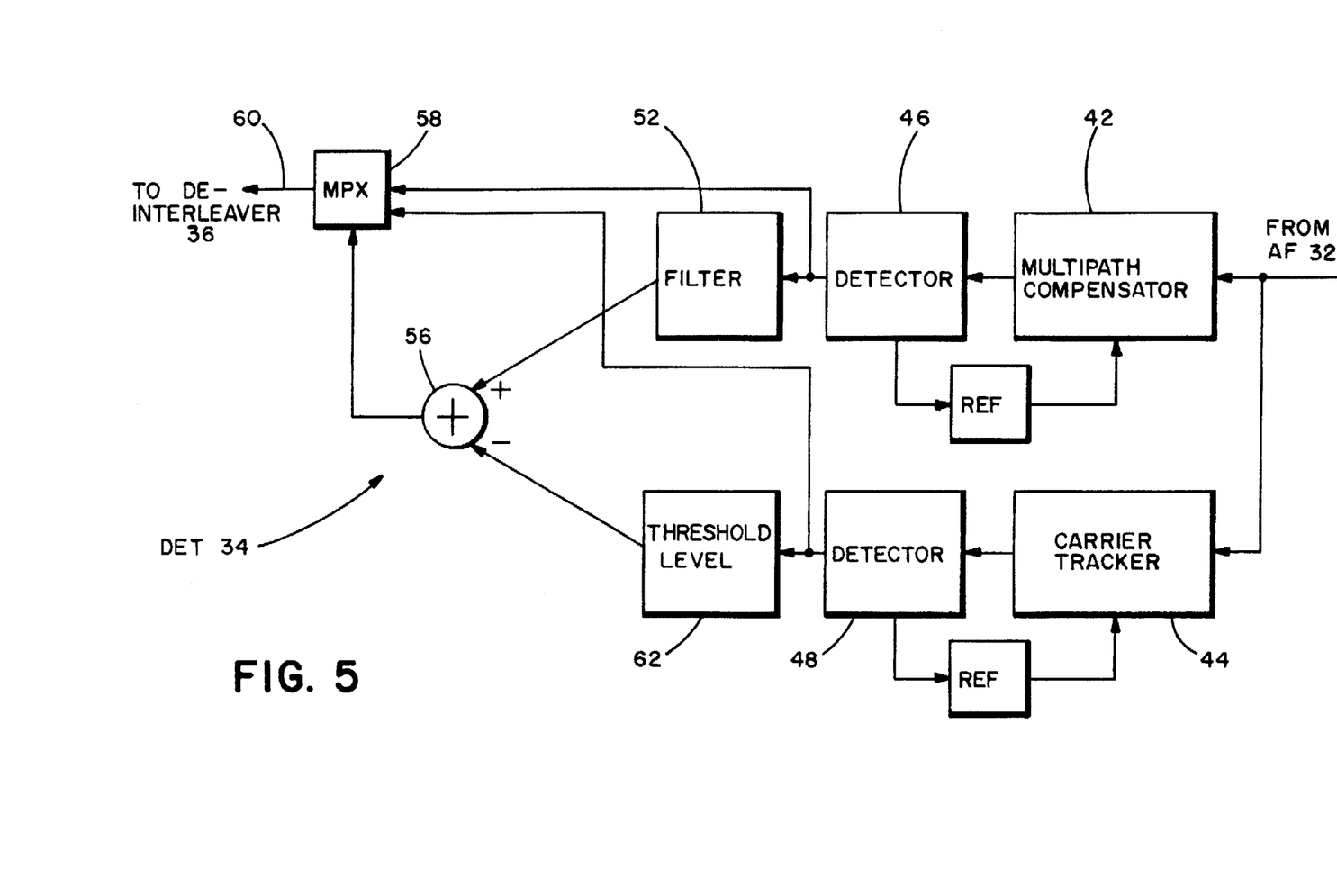
FIG. 5 is a block diagram of a modification of the detector circuit shown in FIG. 3.

In FIG. 5, a circuit is shown substantially similar to that shown in FIG. 3, except that a preset threshold level from block 62 is applied to summer 56. In this case, when the error signal quality from filter 52 exceeds the preset threshold level emanating from threshold level block 62, multiplexer 58 is caused to disconnect output line 60 from detector 46 and to connect it to the output from detector 48.

The above described system has considered the case wherein when a determined Euclidean error from a multipath compensated signal path exceeds the Euclidean error from a noncompensated signal processing path. If it is possible to reinitialize a multipath compensator so as to reduce Euclidean error during a time slot, multipath compensation may be employed for longer durations—thus assuring more accurately determined symbol identities.

Figure 6:
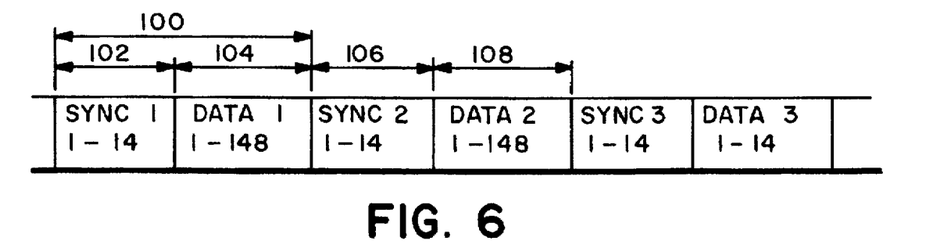
FIG. 6 schematically illustrates a data stream showing two time slots with succeeding synchronizing sequences.

Referring to FIG. 6, a time slot 100 includes a synchronizing sequence 102 followed by a data frame 104. Synchronizing sequence 106 provides the synchronizing signal for a next data frame 108. In the known manner, a cellular telephone is assigned a particular time slot upon being activated. Thus, when the receiving radio telephone determines that its assigned time slot is commencing, it employs the synchronizing sequence (e.g. 102) to equalize an adaptive filter (such as may be contained in multipath compensator 32 in FIG. 2). Further, the sampled symbol values in the incoming data frame are stored for subsequent decoding. So long as a transmission channel's characteristics remain constant over time frame 100, the equalization of the adaptive filter achieved through the use of synchronizing sequence 102 is the best that can be obtained. However, if the multipath characteristic of the channel varies during time slot 100, then equalization achieved through the use of synchronizing signal 102 will probably lead to data losses at some time within data frame 104.

More specifically, calculations that enable conversion of stored symbols to values are not accomplished in real time—but wait until the entire data frame has been sampled, converted to digital values and stored. At such time, the stored symbols are subjected to an adaptive filtering procedure that has been initialized by the use of synch signal 102. Adaptive filter coefficients are calculated to create an inverse filter profile. The inverse frequency profile essentially reverses non linearities in the received signal's frequency spectrum profile to achieve signal compensation. However, if the frequency spectrum profile changes during a data frame, the multipath compensation is required to track these changes. If the multipath compensation is unable to track the changes, it may actually degrade the signal. Thus, as aforedescribed, multipath compensation is removed from the signal processing path upon such an occurrence.

In the event of a significant decrease in signal quality, the synchronizing sequence in a next time frame (even though it is destined for another receiver) can be employed to reinitialize the adaptive filter. Thus, the use of a later-in-time synchronizing sequence that has been subjected to the changed conditions of the signal channel may enable a reinitialization of the adaptive filter so as to provide improved data recovery. When using a later synchronizing sequence, it is important that the stored symbol samples be subjected to the equalization filter in a reverse time order i.e., starting with the samples that are closest in time to the later synchronizing sequence.

Accordingly, as shown in FIG. 6, synchronizing and data symbols 102, 104, and 106 are received and stored in a buffer memory 28a in processor 28 (see FIG. 1). An adaptive filter in multipath compensator (FIG. 3) is then initialized using synchronization sequence 102. The data in data frame 104 is then detected employing detector 46.

Such detection continues until it is concluded (in the manner previously described) that the Euclidean distance error signal is excessive. At such time, the adaptive filter equalizer in multipath compensation circuit 42 is reinitialized by inputting synchronization sequence 106 in reverse time order. At the same time, both signal filters 52 and 54 are reset. Next, assuming that there are 148 data symbols in data frame 104, symbols 148, 147, 146, etc. are detected in reverse time order by multipath compensation circuit 42, employing the reinitialized adaptive filter. This action continues until all symbols, not detected during the forward direction pass, have been detected or until it is concluded that the Euclidean error derived from filter 52 has become excessive—as aforedescribed. In the latter case, the multipath compensation circuit path is disconnected (via the operation of multiplexer 58) and the remaining undetected symbols are detected without its aid.

Figure 7A:
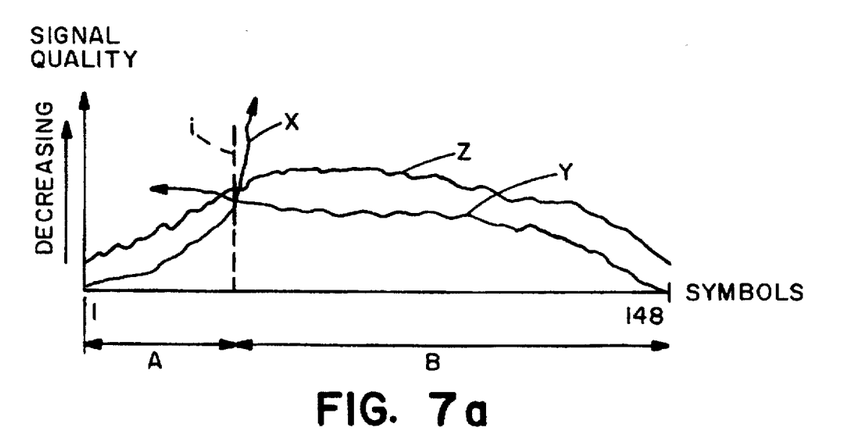
FIG. 7a is a plot of signal quality (error signal) versus received symbols (over time) showing where multipath compensation diverges in the forward direction but is able to compensate remaining symbols when the data frame is detected in the reverse direction using a second synchronizing sequence for initialization.

In FIG. 7(a), a plot of received symbols versus decreasing signal quality (i.e. increasing Euclidean distance) is illustrated. The plot marked x is the trajectory of the value of the Euclidean error signal for the forward direction defection in time i.e. "detection direction". The plot indicated by y is the trajectory of the error signal for the reverse direction detection (i.e. backwards in time) of the data symbols. The plot marked z is the Euclidean error signal determined for the carrier tracker signal processing path. The dotted line marked i indicates the point of intersection between plots x and y.

Note that during time A, the Euclidean error signal values all lie below the error signal values for the carrier tracker signal trajectory. Similarly, during time B, the Euclidean error values for the reverse-time detected symbols also lie below the carrier tracker signal trajectory Z. Thus, if the detected symbols are limited to those detected in the forward direction during time A and those detected in the reverse direction during time B, the Euclidean error signals from both the forward or reverse directions do not exceed the Euclidean error signal derived from the carrier tracking path (plot z). As a result, the data symbol values determined by such forward and reverse detection are accepted and those determined from the carrier tracker path are rejected.

Figure 7B:
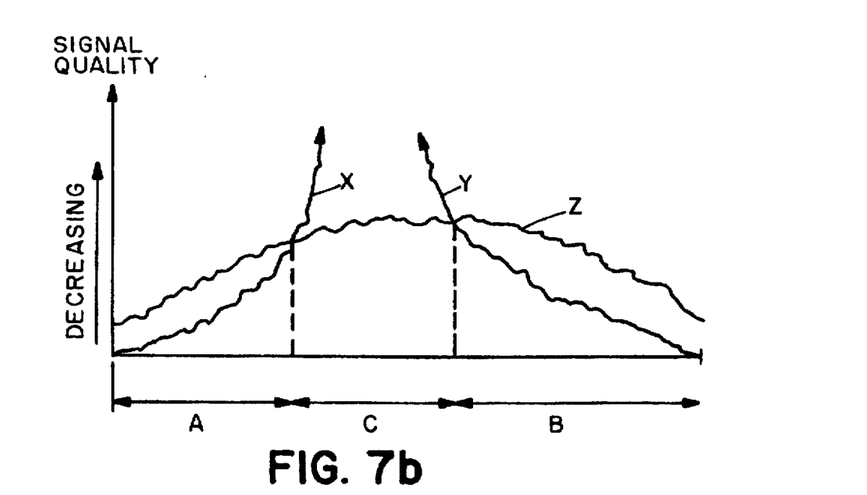
FIG. 7b is the identical plot of FIG. 7a wherein multipath compensation diverges in both forward and reverse directions, with remaining symbols being detected without multipath compensation.

By contrast, as shown in FIG. 7b, the forward direction trajectory x and reverse direction trajectory y diverge and do not intersect. Thus, for time A, the system accepts data derived through forward direction detection; during time B, it accepts data detected in the reverse direction; and during time C, it accepts data derived as a result of carrier tracker path detection. Again, the determination of which detected data identities to use results from Euclidean error signal comparisons.

Figure 8:
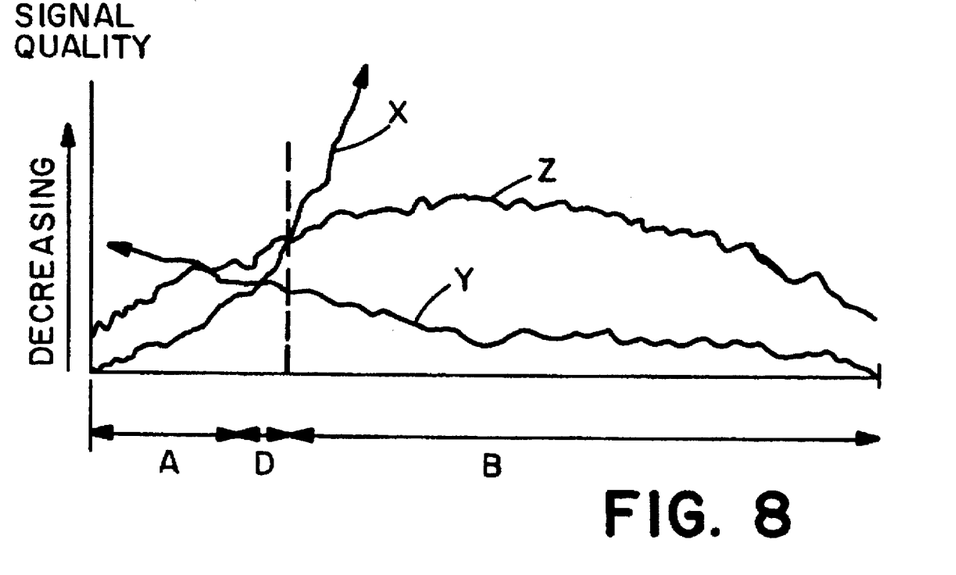
FIG. 8 is a plot identical to that of FIG. 7a that illustrates how forward and reverse direction multipath compensation may be overlapped to improve signal detection.

FIG. 8, illustrates the case where during reverse direction detection (trajectory y), multipath compensation continues to be enabled even though forward direction detection indicates that it should be disabled (i.e., intersection of trajectories x and z). The continued enablement of reverse direction detection causes an additional number of previously detected symbols to again be detected using the reverse direction detection procedure. By overlapping the forward and reverse passes, the probability of correct detection of the overlap symbols immediately prior to compensation failure increases. It is preferred that the number of overlapping signals be a predetermined number that is initially set as a constant.

Figure 9:
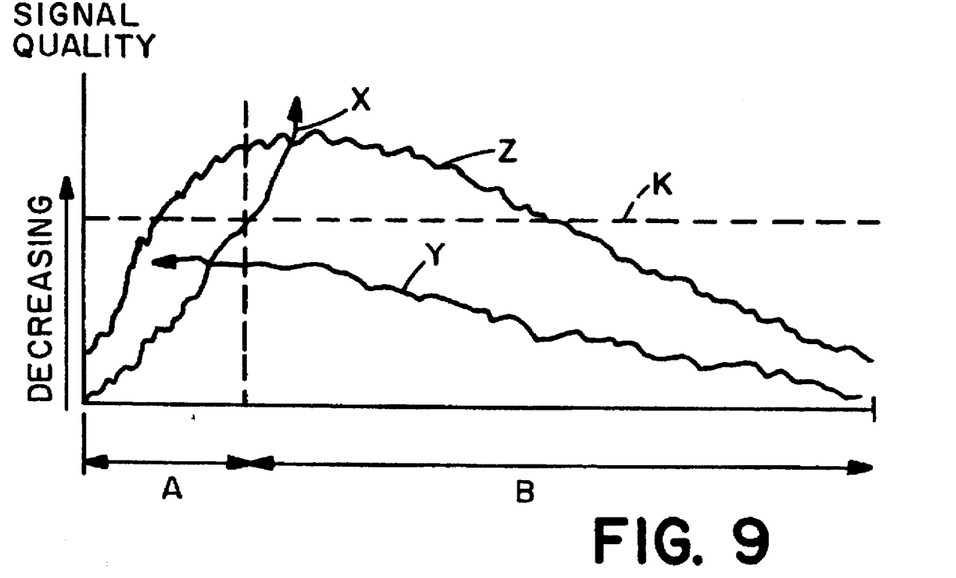
FIG. 9 is a plot identical to that of FIG. 7(a) that illustrates the use of a preset threshold value k for detecting a divergence of multipath compensation.

In a further embodiment, multipath compensation circuitry is disabled when either the Euclidean error signal level exceeds a predetermined level or when the Euclidean error signal exceeds the level of the error signal for the signal tracker channel. In FIG. 9, this operation is illustrated by imposing a predetermined error threshold value k. Threshold value k (and its intersection with error signal trajectory x) indicates the point (or points) at which a change is to be made between forward direction detection and reverse direction detection as above described.

As indicated, initial synchronization is attempted using synchronizing sequence 102 (FIG. 6). If synchronization fails (i.e. indicated by an initial excessive level of Euclidean error signal), initialization is next attempted using second synchronization sequence 106. An attempt is then made to detect the entire data frame 104 (in a reverse direction) employing the multipath compensation signal path. If such detection fails, remaining symbols including initial symbols 1, 2, 3, etc. are detected with the multipath compensation pathway disabled.

In another variant of the initialization process, a complete time slot is first detected by initializing the multipath compensation adaptive filter using the first received synchronizing sequence (e.g. 102). Simultaneously, data frame 104 is also detected without multipath compensation. Then, both detected data sequences are stored, together with values that indicate the trajectories of the Euclidean error signals. Next, the process is repeated in reverse time order with the adaptive filter initialized by employing second synchronization sequence 106. Finally, each detected symbol is selected from the four possibilities by comparing the respectively determined Euclidean error signals and selecting the symbol whose corresponding Euclidean error signal is least.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a digital radio communication system that includes a receiver for receiving a signal stream comprising data frames interspersed with synchronizing signal sequences, the receiver including means for compensating for multipath propagation of said signal stream to provide a compensated signal train, and further means for providing said signal stream as an uncompensated signal train (without multipath compensation), said receiver performing a method for selectively employing said means for compensating, said method comprising the steps of:

(a) operating said means for compensating for multipath propagation to provide said compensated signal train as an output in response to a received signal stream;

(b) detecting said compensated signal train;

(c) employing a first filter means to derive a first error signal estimate for said detected, compensated signal train;

(d) operating said further means to respond to said signal stream and to provide said uncompensated signal train as an output;

(e) detecting said uncompensated signal train;

(f) employing a second filter means to derive a second error signal estimate for said uncompensated signal train detected in step (e), said second filter means exhibiting a slower filter output response to an input than said first filter means;

(g) comparing said first error signal estimate with said second error signal estimate to arrive at a determination when said first error signal estimate reaches a determined level;

(h) disabling said compensated signal train output when said first error signal estimate reaches said determined level; and (i) detecting a portion of said signal stream that occurs after said disabling without multipath propagation compensation.

2. The method as recited in claim 1 wherein said means for compensating for multipath propagation is initialized by a synchronizing signal sequence before receiving a data frame, and is reinitialized upon a next received synchronizing signal sequence so as to be operable in accordance with steps (a)–(i).

3. The method as recited in claim 1 wherein said deriving of said first error signal estimate comprises the steps of:

calculating an error signal that is indicative of a measure of an Euclidean distance between an expected phase signal constellation point and a sampled phase signal constellation point derived from said compensated signal train output; and employing said first filter means to average a plurality of said error signals to derive said first error signal estimate.

4. The method as recited in claim 3 wherein said first error signal estimate is derived from a received synchronizing sequence.

5. The method as recited in claim 1 wherein said determined level is reached when said first error signal estimate exceeds said second error signal estimate.

6. The method as recited in claim 5 wherein said second error signal estimate is modified by multiplication by a constant, prior to said comparing step (g).

7. The method as recited in claim 1 wherein said deriving of said second error signal estimate comprises the steps of:

calculating an error signal that is indicative of a measure of an Euclidean distance between an expected phase signal constellation point and a sampled phase signal derived from said uncompensated signal train; and employing said second filter means to average a plurality of said error signals to derive said second error signal estimate.

8. The method as recited in claim 1 wherein said first and second signal error estimates are derived from a synchronizing sequence, said method comprising the further step of:

detecting a data frame following said synchronizing sequence without multipath propagation compensation, if the first signal error quality estimate exceeds the second signal error estimate by a predetermined level.

9. A method as recited in claim 1 comprising the further steps of:

counting a number of symbols received during a period when said compensated signal train output is enabled; and detecting a data frame without subjecting it to multipath propagation compensation, if the number of symbols that are counted does not exceed a threshold.

10. In a digital radio communications system that includes a base station and at least one receiver for receiving from the base station a signal stream that comprises time slots including data frames interspersed with synchronizing signal sequences, the receiver assigned a given time slot by the base station, the receiver including multipath means for compensating for multipath propagation of the signal stream and performing a method comprising the steps of:

a) employing a synchronizing signal sequence from said given time slot to initialize a frequency response characteristic of an adaptive filter in said multipath means;

b) operating said multipath means to respond to said signal stream after initialization of said adaptive filter, so as to provide a multipath compensated signal train output;

c) detecting said compensated signal train output to derive data values from a data frame following said given time slot synchronizing signal sequence;

d) deriving a first error signal estimate trajectory for said detected, compensated, data values;

e) if said first error signal estimate trajectory reaches a determined level, employing a synchronizing sequence in a next time slot that follows said data frame to reinitialize said frequency response characteristic of said adaptive filter;

f) operating said multipath means including said adaptive filter that has been reinitialized to detect said data frame in reverse time order to thereby derive data values therefrom;

g) deriving a second error signal estimate trajectory based upon said derived data values obtained in step (f);

h) detecting said signal stream without multipath propagation compensation to determine non-compensated data values therefrom and deriving a third error signal estimate trajectory therefrom; and i) employing said first, second and third error signal estimate trajectories to determine which data values should be further processed and discarding any data value derived from a symbol when both said first and second error signal estimate trajectory values for said symbol are greater than said third error signal estimate trajectory value for said same symbol and, instead, employing for further processing a non-compensated data value for said symbol as determined in step (h).

11. The method as recited in claim 10 wherein a point of intersection between said first and second error signal estimate trajectories is determined, said point of intersection being utilized to determine whether data values should be accepted from detecting step (c) or detecting step (h).

12. In a digital radio communications system that includes a base station and at least one receiver for receiving from the base station a signal stream that comprises time slots including data frames interspersed with synchronizing signal sequences, the receiver assigned a given time slot by the base station, the receiver including multipath means for compensating for multipath propagation of the signal stream and performing a method comprising the steps of:

a) employing a synchronizing signal sequence from said given time slot to initialize a frequency response characteristic of said multipath means;

b) operating said multipath means to convert said signal stream into a multipath compensated signal train output;

c) detecting said compensated signal train output to derive data values from a data frame following said given time slot synchronizing signal sequence, d) deriving a first error signal estimate trajectory for said detected, compensated, data values;

e) detecting a non compensated version of said signal train to derive data values from a data frame following said given time slot synchronizing signal sequence;

f) deriving a second error signal estimate trajectory for said data values detected in step (e);

g) employing a synchronizing sequence in a next time slot that follows said data frame to reinitialize said frequency response characteristic of said multipath means;

h) operating said multipath means, after reinitialization, to detect said data frame in reverse time order to thereby derive data values therefrom;

i) repeating step d for data values derived in step h to derive an error signal estimate trajectory therefor;

j) repeating steps (e) and (f), but for data values derived in reverse time order from said signal train to derive an error signal estimate trajectory therefor; and k) employing for further processing a set of data values derived in either step (c) or step (e) or step (h) that exhibits a lowest error signal estimate, as determined from error signal estimate trajectories derived in steps (d), (f), (i) and (j).

13. In a digital radio communication system that includes a receiver for receiving a signal stream comprising data frames interspersed with synchronizing signal sequences, the receiver including multipath means for compensating for multipath propagation of said signal stream to provide a compensated signal train, and further means for providing said signal stream as an uncompensated signal train, said receiver performing a method for selectively employing said multipath means, said method comprising the steps of:

(a) operating said multipath means to provide said compensated signal train as an output in response to a received signal train;

(b) detecting said compensated signal train;

(c) employing a first filter means to derive a first error signal estimate for said detected, compensated signal train;

(d) operating said further means to respond to said signal stream and to provide said uncompensated signal train as an output;

(e) detecting said uncompensated signal train;

(f) employing a second filter means to derive a second error signal estimate for said uncompensated signal train detected in step (e);

(g) comparing said first error signal estimate and said second error signal estimate to arrive at a determination when said first error signal estimate exceeds the second error signal estimate;

(h) comparing said first error signal with a threshold value;

(i) disabling said compensated signal train output when said first error signal estimate exceeds said second error signal estimate or exceeds said threshold value; and (j) detecting a portion of said signal stream that occurs after said disabling without multipath propagation compensation.

14. In a digital radio communication system that includes a receiver for receiving a signal stream comprising data frames interspersed with synchronizing signal sequences, the receiver including multipath means for compensating for multipath propagation of said signal stream to provide a compensated signal train, and further means for providing said signal stream as an uncompensated signal train, said receiver performing a method for selectively employing said multipath means, said method comprising the steps of:

(a) operating said multipath means to provide said compensated signal train as an output in response to a received signal train;

(b) detecting said compensated signal train;

(c) employing a first filter means to derive a first error signal estimate for said detected, compensated signal train;

(d) operating said further means to respond to said signal stream and to provide said uncompensated signal train as an output;

(e) detecting said uncompensated signal train;

(f) employing a second filter means to derive a second error signal estimate for said uncompensated signal train detected in step (e);

(g) Comparing said first error signal estimate and said second error signal estimate to arrive at a determination when said first error signal estimate exceeds the second error signal estimate;

(h) comparing said first error signal with a threshold value;

(i) disabling said compensated signal train output when said first error signal estimate exceeds said second error signal estimate or exceeds said threshold value;

(j) employing a synchronizing sequence in a next time slot that follows said data frame to reinitialize said frequency response characteristic of said multipath means;

(k) operating said multipath means, after reinitialization, to detect said data frame in reverse time order to thereby derive data values therefrom;

(l) deriving a third error signal estimate trajectory for said data values detected in step (k);

(m) disabling said compensated signal train output when said third error signal estimate exceeds said second error signal estimate or exceeds said threshold value; and (n) detecting a portion of said signal stream that occurs after said disabling in steps i and m without multipath propagation compensation.

* * * * *